(12) United States Patent
Books et al.

(10) Patent No.: US 6,408,624 B1
(45) Date of Patent: Jun. 25, 2002

(54) SYSTEM FOR CONTROLLING TRANSIENT COMPRESSOR SURGE IN A TURBOCHARGED INTERNAL COMBUSTION ENGINE

(75) Inventors: Martin T. Books; Glenn L. Baker, both of Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/771,754

(22) Filed: Jan. 29, 2001

(51) Int. Cl.$^7$ .............................................. F02D 23/00
(52) U.S. Cl. ........................................ 60/601; 60/603
(58) Field of Search .............................. 60/605.2, 601, 60/603, 605.1

(56) References Cited

U.S. PATENT DOCUMENTS

| | | | |
|---|---|---|---|
| 4,606,191 A | 8/1986 | Collins et al. ............. | 60/39.281 |
| 4,633,670 A | * 1/1987 | Iwasa .......................... | 60/603 |
| 4,662,817 A | 5/1987 | Clark et al. .................... | 415/1 |
| 4,909,219 A | 3/1990 | Perr et al. ................... | 123/456 |
| 5,117,625 A | 6/1992 | McArthur et al. ......... | 60/39.07 |
| 5,222,356 A | 6/1993 | Evenson et al. ........... | 60/39.02 |
| 5,235,801 A | 8/1993 | Evenson et al. ........... | 60/39.02 |
| 5,386,698 A | * 2/1995 | Kamel .......................... | 60/603 |
| 5,526,645 A | 6/1996 | Kaiser ......................... | 60/611 |
| 5,594,665 A | 1/1997 | Waiter et al. ................ | 364/558 |
| 5,752,378 A | 5/1998 | Mirsky et al. ............. | 60/39.03 |
| 6,192,867 B1 | * 2/2001 | Fenchel et al. ........... | 60/603 X |

* cited by examiner

Primary Examiner—Hoang Nguyen
(74) Attorney, Agent, or Firm—Barnes & Thornburg

(57) ABSTRACT

A system and method are provided for avoiding transient compressor surge in a turbocharged internal combustion engine. The system includes a control circuit responsive to at least one engine operating parameter to determine a minimum fueling limit that is generally higher under certain engine operating conditions than the default engine fueling value. Under such conditions, the minimum fueling limit is used to establish a lower limit of fuel supplied to the engine in order to avoid turbocharger transient compresser surge conditions. In one embodiment, the at least one engine operating parameter includes intake manifold air pressure, and in an alternative embodiment, the at least one engine operating parameter further includes intake manifold air temperature. In either case, the at least one engine operating parameter also preferably includes engine speed.

19 Claims, 6 Drawing Sheets

FUELING LIMIT TABLE

|      | ES1 | ES2 | ES3 | ••• | $ES_M$ |
|------|-----|-----|-----|-----|-----|
| IMP1 | $FL_{11}$ | $FL_{12}$ | $FL_{13}$ | • • • | 0 |
| IMP2 | $FL_{21}$ | $FL_{22}$ | 0 | • • • | 0 |
| IMP3 | $FL_{31}$ | 0 | 0 | • • • | 0 |
| ⋮ | | | | | |
| $IMP_N$ | 0 | 0 | 0 | • • • | 0 |

SYSTEM FOR CONTROLLING TRANSIENT COMPRESSOR SURGE IN A TURBOCHARGED INTERNAL COMBUSTION ENGINE

FIELD OF THE INVENTION

The present invention relates to systems for controlling the operation of turbocharged internal combustion engines, and more specifically to systems for eliminating, or at least minimizing, transient turbocharger compressor surge.

BACKGROUND OF THE INVENTION

Turbochargers are well known devices for pressurizing intake air entering the combustion chambers of an internal combustion engine and thereby increasing the efficiency and power output of the engine. In general, pressurizing the intake air increases the quantity of air entering the engine cylinders during the intake stroke, and this allows more fuel to be utilized in establishing a desired air/fuel ratio. Increased available engine output torque and power is thereby realized.

As is known in the art, turbochargers utilize outgoing exhaust gas from the engine to pressurize the intake air. Referring to FIG. 1, an example of a known internal combustion engine turbocharging system 10 is shown. Exhaust gases from the engine enter an exhaust gas inlet of turbocharger 12 via exhaust manifold 14 and strike a turbine wheel 16 causing it to rotate. Exhaust gases exit the turbocharger 12 via exhaust gas outlet 18. The rotational forces imparted to the turbine wheel 16 by the exhaust gases are transferred to a compressor wheel 22 of turbocharger 12 via shaft 20. As the piston 30 moves downwardly within cylinder 36 on the intake stroke, air is drawn from air inlet 24 into the combustion chamber 28, defined as the area above the piston 30, via intake manifold 26. The pressure provided by turbocharger compressor 22 increases the air pressure within intake manifold 26, thereby supplying additional air to the combustion chamber 28 and providing for injection of additional fuel quantities.

The compressed air in intake manifold 26 is mixed with fuel supplied by a fuel source (not shown), and this mixture is supplied to the combustion chamber 28 of an engine cylinder 36 via intake valve 32. The air/fuel mixture is then compressed and ignited during a known combustion process. As the piston 30 moves up during the exhaust stroke, burnt exhaust gases created by the combustion event are expelled from the combustion chamber 28 into the exhaust manifold 14 via exhaust valve 34.

Two types of compressor surge are known to occur in highly turbocharged engines. Perhaps the most common type, referred to here as steady state compressor surge, occurs under essentially steady state values of engine speed and engine fueling rates. As engine speed is decreased at high values of turbocharger compressor ratio, a turbocharger compressor surge threshold is eventually reached, and at engine speeds beyond this threshold, stable compressor flow is no longer possible. As a consequence, a sudden reversal in compressor and intake manifold air flow occurs, resulting in a surge conditions that causes intake manifold pressure to decrease by an amount generally proportional to the intensity of the surge condition.

A second and less common type of compressor surge, referred to here as transient compressor surge, does not require initial operation of the turbocharger compressor near the compressor surge threshold. Rather, transient compressor surge may initiate from normal compressor ratio/engine speed conditions. In contrast to steady state compressor surge, transient compressor surge is triggered by a sudden and substantial reduction in engine fueling rate. When engine output power is severely and rapidly dropped from an initially high value, the volume and flow of exhaust gas striking the turbine 16 is likewise rapidly reduced, thereby resulting in an instantaneous and severe drop in turbocharger driving force. Unfortunately, the air pressure within the intake manifold 26, which is typically at an initially high value due to the high engine power demand, decays much more slowly than the rate of reduction in turbocharger driving force. The air pressure within the intake manifold 26 under such conditions thus slows the rotational movement of the compressor wheel 26. Transient compressor surge occurs when the accumulated pressure in the intake manifold 26 exceeds the compressor's ability to sustain positive air movement. Since the rate of intake manifold pressure decay is inversely proportional to the total mass of air in the intake system, factors and conditions such as large intake manifold volumes, high intake manifold pressure and low intake manifold temperatures tend to contribute to transient compressor surge.

The slow decay of intake manifold pressure during conditions of low engine power demand immediately following high engine output power operation can result in undesirable turbocharger surge conditions as just described. Turbocharger surge can damage the compressor and/or create excessive engine noise, sudden power loss and severe vibration, thereby adversely affecting engine performance and creating a potential for engine damage. As the engine operator attempts to bring the turbocharger out of surge by increasing engine speed, the surge condition of the compressor impedes the rotational movement of the turbine, thereby impeding or slowing the acceleration rate. Multiple occurrences of compressor surge may decrease the longevity of the turbocharger and engine.

Previous attempts at eliminating or minimizing transient compressor surge have led to undesirable side effects. For example, modifications to engine fuel system control algorithms and/or mechanical fuel systems have been devised to reduce the rate of response of the fuel system to changes in throttle position. However, the extent of response dampening required to eliminate transient surge produces an unacceptable loss in engine acceleration rate when demanded by the operator. Other attempts to eliminate or minimize compressor surge include systems that control the rate of change of delivered fuel upon detection of compressor surge. These systems are undesirable since they operate only after compressor surge is experienced.

What is therefore needed is a system for eliminating or minimizing transient compressor surge without negatively affecting engine acceleration or fuel economy of the engine to which the turbocharger is coupled, and which is operable to control turbocharger operation to avoid transient compressor surge conditions before such surge conditions occur.

SUMMARY OF THE INVENTION

The foregoing shortcomings of the prior art are addressed by the present invention. In accordance with one aspect of the present invention, a system for controlling transient compressor surge in a turbocharged internal combustion engine comprises a turbocharger including a turbocharger compressor fluidly coupled to a cylinder of an internal combustion engine via an intake manifold, means for determining an operating condition of the intake manifold and producing an intake manifold parameter signal corresponding thereto, a fuel system responsive to a fueling command to supply fuel to the engine, and a control circuit limiting the fueling command to a minimum fueling limit based at least on the intake manifold parameter signal to avoid turbocharger transient compressor surge.

In accordance with another aspect of the present invention, a method of controlling transient compressor surge in a turbocharged internal combustion engine comprises the steps of sensing at least one operating parameter of a turbocharged internal combustion engine, determining a minimum fueling value as a function of the at least one operating parameter, wherein the minimum fueling value corresponds to a minimum fueling condition at which turbocharger transient compressor surge is avoided, and fueling the engine with a lower fueling limit defined by the minimum fueling value.

One object of the present invention is to provide a system for controlling fueling of an internal combustion engine in a manner that avoids turbocharger transient compressor surge.

Another object of the present invention is to provide such a system by controlling fueling to establish a minimum fueling value as a function of at least one engine operating parameter.

These and other objects of the present invention will become more apparent from the following description of the preferred embodiment.

BRIEF DESCRIPTION OF THE DRAWINGS

FIG. 5 is a table of fueling limit values illustrating one preferred technique for executing the fueling limit determination step of FIG. 4.

DESCRIPTION OF THE PREFERRED EMBODIMENT

Figure 1:
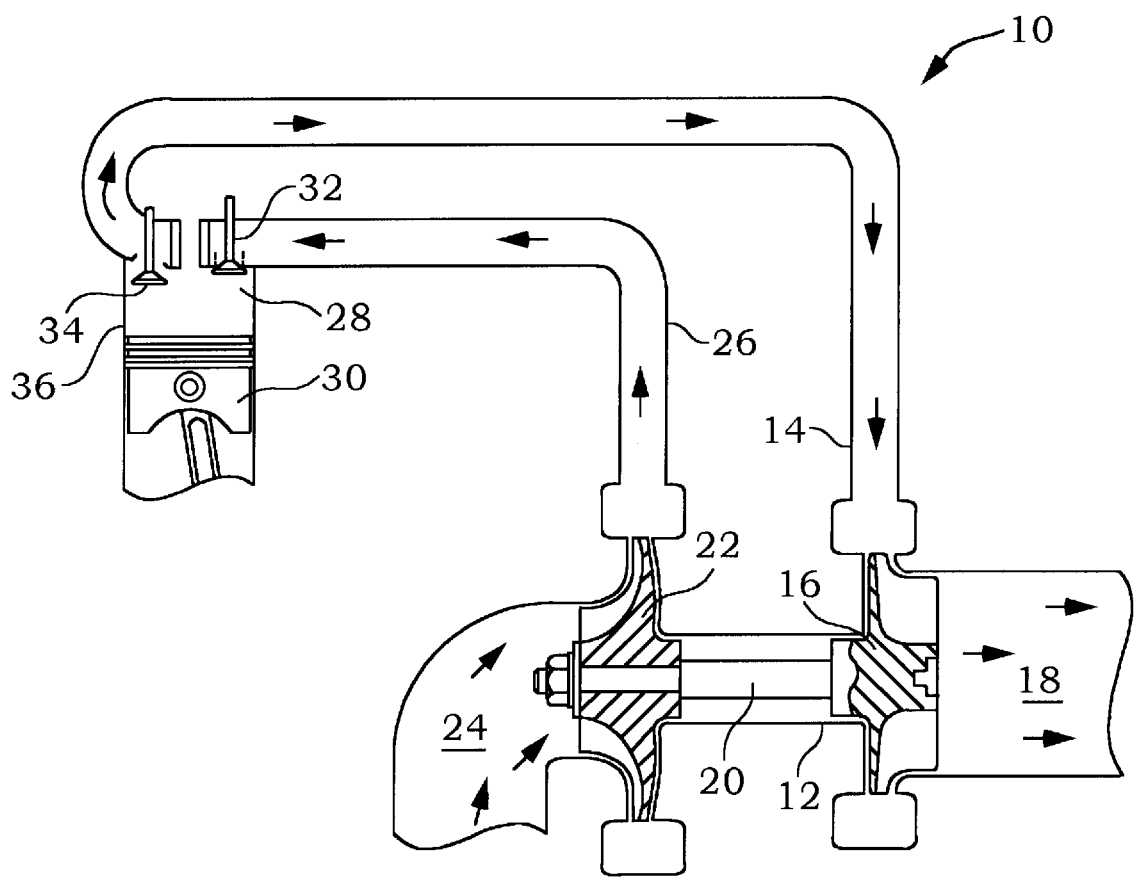
FIG. 1 is a diagrammatic illustration of a known internal combustion engine turbocharging system.

For the purposes of promoting an understanding of the principles of the invention, reference will be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention pertains.

Figure 2:
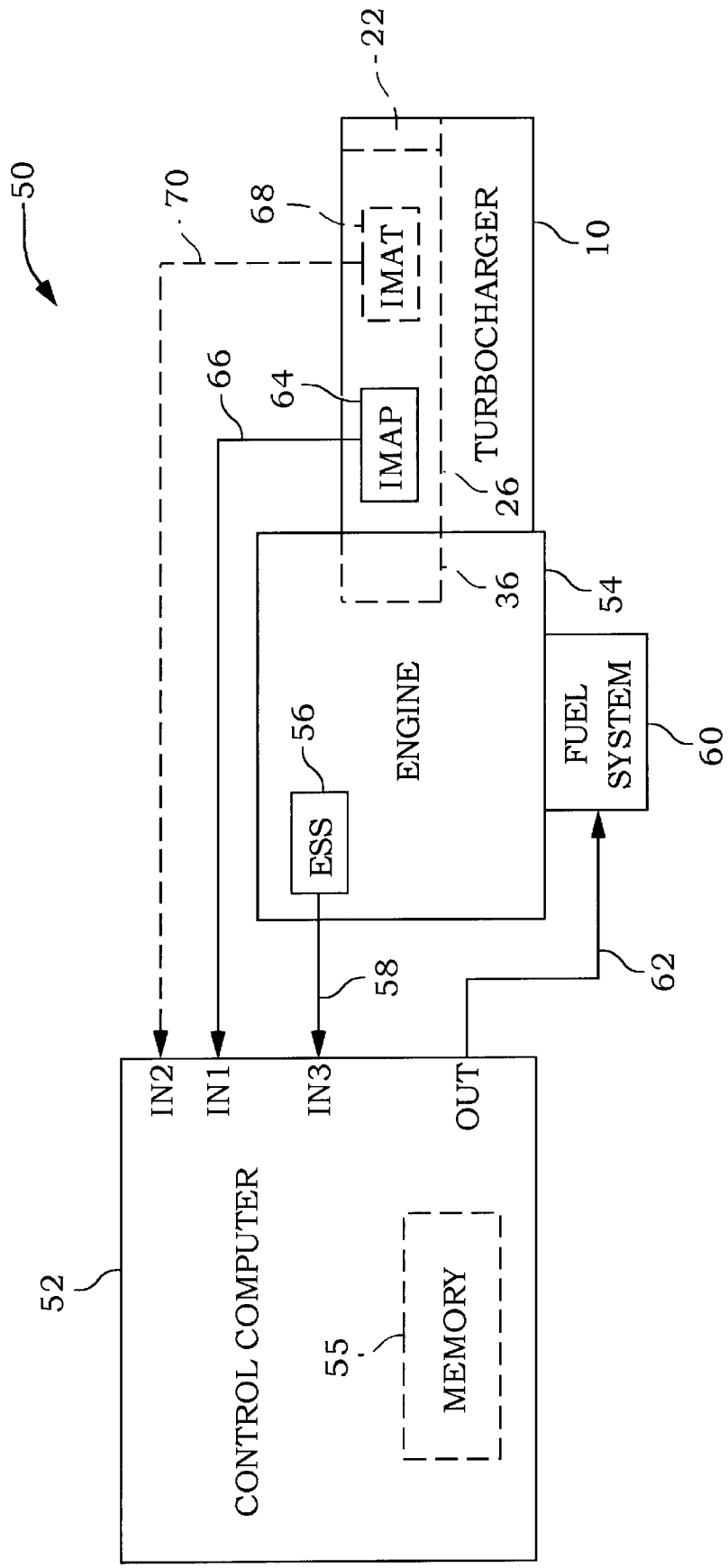
FIG. 2 is a diagrammatic illustration of one preferred embodiment of an electronic system for controlling turbocharger transient compressor surge, in accordance with the present invention.

Referring now to FIG. 2, one preferred embodiment of a system 50 for controlling turbocharger transient compressor surge, in accordance with the present invention, is shown. Central to system 50 is a control computer 52 including a memory unit 55. Preferably, control computer 52 is microprocessor-based and is operable to control and manage the overall operation of an internal combustion engine 54 in accordance with one or more software programs resident within memory 55. In this embodiment, control computer 52 may thus typically be referred to as an engine or electronic control module (ECM), engine or electronic control unit (ECU) or the like. It is to be understood, however, that the present invention contemplates that control computer 52 may be replaced in system 50 by a combination of control circuits without detracting from the scope of the present invention.

Engine 54 has a turbocharger 10 suitably mounted thereto, wherein the turbocharger illustrated in FIG. 2 may be identical to the turbocharger 10 illustrated and described in the BACKGROUND section with respect to FIG. 1, and like numbers are therefore used to identify like components. It is to be understood, however, that the present invention contemplates alternate structures of turbocharger 10, but wherein any such alternate turbocharger structure defines an intake manifold 26 between a turbocharger compressor 22 and at least one cylinder 36 of engine 54 as shown in phantom.

System 50 includes a number of sensors or sensing systems operable to determine one or more operating conditions associated with engine 54 and provide such information to control computer 52. For example, in the embodiment illustrated in FIG. 2, control computer 52 includes a first input IN1 electrically connected to an intake manifold air pressure (IMAP) sensor 64 disposed within, or mounted in fluid communication with, intake manifold 26 via signal path 66. IMAP sensor 64 is preferably of known construction, and in one embodiment is a conventional piezo-electric pressure sensor. Alternatively (or in addition to IMAP sensor 64), system 50 may include an intake manifold air temperature (IMAT) sensor 68, as shown in phantom, disposed within, or mounted in fluid communication with, intake manifold 26 and electrically connected to input IN2 of control computer 52 via signal path 70. IMAT sensor 68 is also preferably of known construction, and in one embodiment is a conventional thermistor-based temperature sensor. System 50 further includes an engine speed sensor 56 disposed within, or mounted to, engine 56 and electrically connected to a third input IN3 of control computer 52 via signal path 58. Engine speed sensor 56 is preferably of known construction, and in one embodiment is a conventional Hall effect sensor operable to sense engine rotational speed and produce an engine speed signal on signal path 58 corresponding thereto. It is to be understood, however, that the present invention contemplates alternatively providing other known engine speed sensing structures such as, for example, variable reluctance sensors and the like.

Engine 54 further includes a fuel system 60 electrically connected to an output OUT of control circuit 52 via signal path 62. Fuel system 60 is preferably of known construction and is responsive to fueling command signals produced by control computer 52 at output OUT to controllably supply fuel to engine 54 as is known in the art.

As described hereinabove in the BACKGROUND section, turbocharger transient compressor surge may occur when engine output power is sharply reduced from initially high to low output power. Under such conditions, the accumulated air pressure within the intake manifold 26 may exceed the ability of the compressor 22 to sustain positive air movement in which case turbocharger compressor surge results. This phenomenon is illustrated graphically in FIG. 3 which shows a plot of intake manifold pressure ratio (i.e., ratio of intake manifold output pressure to intake manifold input pressure) vs. mass air flow therethrough for one known turbocharged engine. The various dashed line boundaries represent lines of constant compressor efficiency. Thus, for example, dashed line 82 corresponds to 60% compressor efficiency, dashed line 84 corresponds to 65% compressor efficiency, etc. The various downwardly bending solid lines represent lines of constant turbocharger speed (i.e., rotational speed of the compressor 22, shaft 20 and turbine 16 of FIG. 1). For example, line 86 corresponds to a turbocharger speed of approximately 98,200 RPM, line 88 corresponds to a turbocharger speed of approximately 88,300 RPM, etc. The area 90 to the left of the plotted intake manifold pressure ratio and mass air flow map 80 represents intake manifold pressure ratio and mass air flow conditions wherein turbocharger compressor surge conditions exist (hereinafter referred to as the "surge region"). The dashed line 92 then represents the intake manifold pressure ratio and mass air flow boundary between turbocharger compressor surge and normal turbocharger compressor operation.

Superimposed onto map 80 is a cross-hatched region 94 that represents a so-called "transient surge potential region". In general, if a turbocharger is operating within region 94, certain changes in turbocharger operating conditions, such as those described hereinabove, will force the operation of turbocharger 10 into the surge region 90. Also superimposed onto map 80 are a number of lines of substantially constant engine speed. For example, line 96 corresponds to idle RPM, line 98 corresponds to an engine RPM at which the onset of peak engine output torque occurs and line 100 corresponds to so-called "rated speed" which is generally defined as an engine RPM at which engine 54 achieves an advertised output torque, or as the maximum loaded speed of the engine 54. Curved line 95 represents the maximum engine power level at all engine speed lines 96, 98 and 100, which is otherwise commonly known in the art as the engine output torque curve.

It is readily apparent from map 80 that a portion of the transient surge potential region 94 overlaps a portion of achievable engine speed values defined by boundaries 95, 96 and 100, and this overlap area 102 is defined as the "transient surge danger area". The transient surge danger area 102 thus represents normal engine operating conditions, which may lead to operation in the surge region 90 as described hereinabove. For example, if the engine is operating at an engine speed, intake manifold pressure ratio and mass air flow rate corresponding to point 104 in FIG. 3, a rapid decrease in engine output power (or torque) will cause operating point 104 to move generally along dashed-line 106 yet remain within map 80. However, if the engine 54 is operating at high output power (or torque) within region 102 as illustrated by operating point 108, a rapid decrease in engine output power (or torque) under normal (default) fueling conditions will cause operating point 108 to move generally along dashed-line 110 and cross boundary 92 into the surge region 90.

It is a primary aim of the present invention to avoid the surge region 90 by controlling the resulting path of engine operating conditions when rapidly decreasing engine output power from an initially high level to a low output power level during operation within the transient surge danger area 102. For example, if point 108 represents the current operating conditions, the fueling command signals produced at output OUT of control computer 52 are preferably modified such that the operating conditions generally move along path 112 if/when engine output power is rapidly reduced from an initially high output power level to a low output power level so that engine operating conditions remain within map 80 (i.e., to the right of boundary 92).

Figure 4:
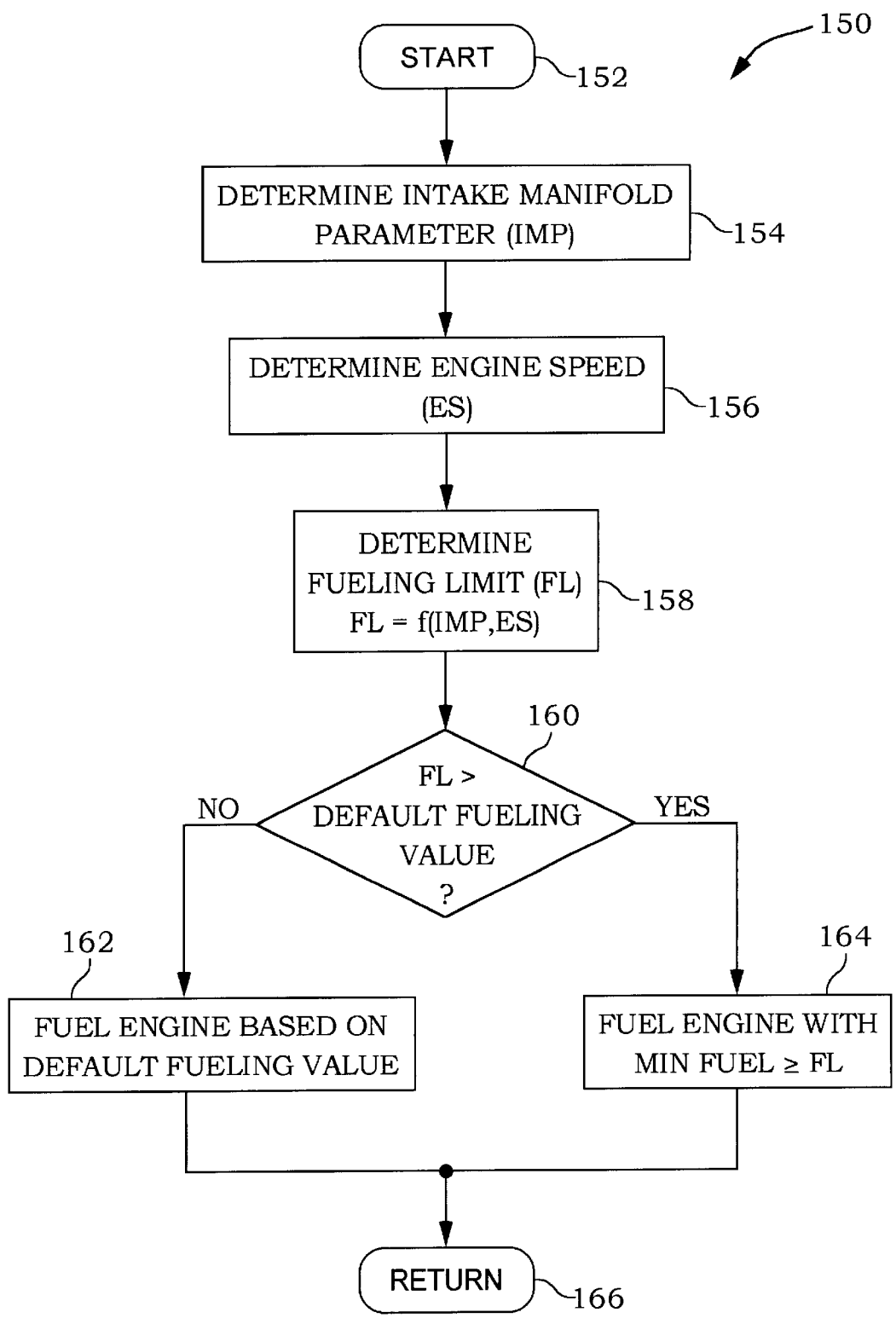
FIG. 4 is a flowchart illustrating one preferred embodiment of a software algorithm for controlling turbocharger transient compressor surge via the system of FIG. 2, in accordance with the present invention.

Preferably, memory unit 55 of control computer 52 includes a software algorithm for controlling the fueling command signals as just described. In one algorithm embodiment, for example, the control computer 52 is operable to determine when engine operating conditions are within the transient surge danger area 102, and to impose a limit on the minimum value of the fueling command signals provided to fuel system 60 in order to avoid operation within the turbocharger compressor surge region 90. Referring now to FIG. 4, a flowchart is shown illustrating one preferred embodiment of such a software algorithm 150 that is preferably stored within memory unit 55 and executed by control computer 52 to control system 50 as just described. Algorithm 150 begins at step 152, and at step 154 control computer 52 is operable to determine an intake manifold operating parameter (IMP). In one embodiment, system 50 includes intake manifold air pressure sensor (IMAP) 64, and in this embodiment, control computer 52 is operable to execute step 154 by monitoring the pressure signal produced by IMAP 64 and computing therefrom an air density value, in accordance with well-known equations, from which an intake manifold air pressure ratio value is subsequently computed, also in accordance with well-known equations. In an alternative embodiment, system 50 includes intake manifold temperature sensor (IMAT) 68, and in this embodiment, control computer 52 is operable to execute step 154 by monitoring the pressure signal produced by IMAP 64 and computing an air density value therefrom in accordance with well-known equations as just described. In this embodiment, control computer 52 is additionally operable at step 154 to monitor the temperature signal produced by IMAT 68, and to compute an intake manifold air pressure ratio value as a function of the current intake manifold temperature value and the air density value computed from the pressure signal, also in accordance with well-known equations. Generally, use of the air density value determined as a function of the intake manifold air pressure signal will provide for an adequate estimate of the intake manifold air pressure ratio value in many applications, and in cases where further precision is desired, the intake manifold air temperature signal may be included in the calculation. In any case, control computer 52 is operable at step 154 to determine at least one engine operating condition from which an intake manifold pressure ratio, or equivalent, or similar, operating parameter value may be determined to thereby provide information indicative of operating conditions within the intake manifold 26.

From step 154, algorithm execution advances to step 156 where control computer 52 is operable to determine a current engine speed value (ES). Preferably, control computer is operable to execute step 156 by monitoring the engine speed signal produced by the engine speed sensor 56, although the present invention contemplates determining engine speed according to other known techniques including, but not limited to, receiving such information broadcast by another system onto a known datalink or by computing such information as a function of vehicle speed and transmission gear ratio. In any case, steps 154 and 156 are intended to provide control computer 52 with information from which control computer 52 can ascertain whether the current engine operating conditions fall within the surge danger area 102 of FIG. 3.

From step 156, algorithm execution advances to step 158 where control computer 52 is operable to determining a fueling limit value (FL) as a function of at least IMP and ES, and optionally as a further function of IMT. One embodiment of step 158 is illustrated in FIG. 5 which shows a fueling limit table 170 having columns (or rows) defined by a number, M, of discrete ES values and rows (or columns) defined by a number, N, of discrete IMP values, wherein M and N may each be any positive integer. The table values then correspond to fueling limit values $FL_{XY}$ that have been predetermined as functions of IMP and ES as described hereinabove. In one embodiment of table 170, the ES values are increasing from left to right and the IMP values are decreasing from top to bottom, and in general $FL_{XY}$ increases with decreasing ES values and increases with increasing IMP values. In this embodiment, the table 170 preferably includes zeros wherever engine operating conditions are outside of the transient surge danger area 102, although the present invention contemplates alternatively providing algorithm 150 with a decision step wherein it may be determined prior to execution of table 170, and based on information provided at steps 154 and/or 156, whether engine operation is currently within the transient surge danger area 102. If not, the algorithm 150 may bypass table 170 at step 158. If, however, control computer 52 determines in this case that engine operation is currently within the transient surge danger area 102, table 170 is executed at step 158. In this alternative embodiment, table 170 thus need not include zeros but instead may be completely populated with fueling limit values $FL_{XY}$.

It is to be understood that while table 170 is illustrated and described as being a two-dimensional table of IMP and ES values, it may alternatively be a three-dimensional table of IMP, ES and IMT values for more accurate operation as described hereinabove. Alternatively still, this same effect may be achieved by maintaining table 170 as a two-dimensional, but with the IMP values being replaced with some function of both IMP and IMT.

Figure 6:
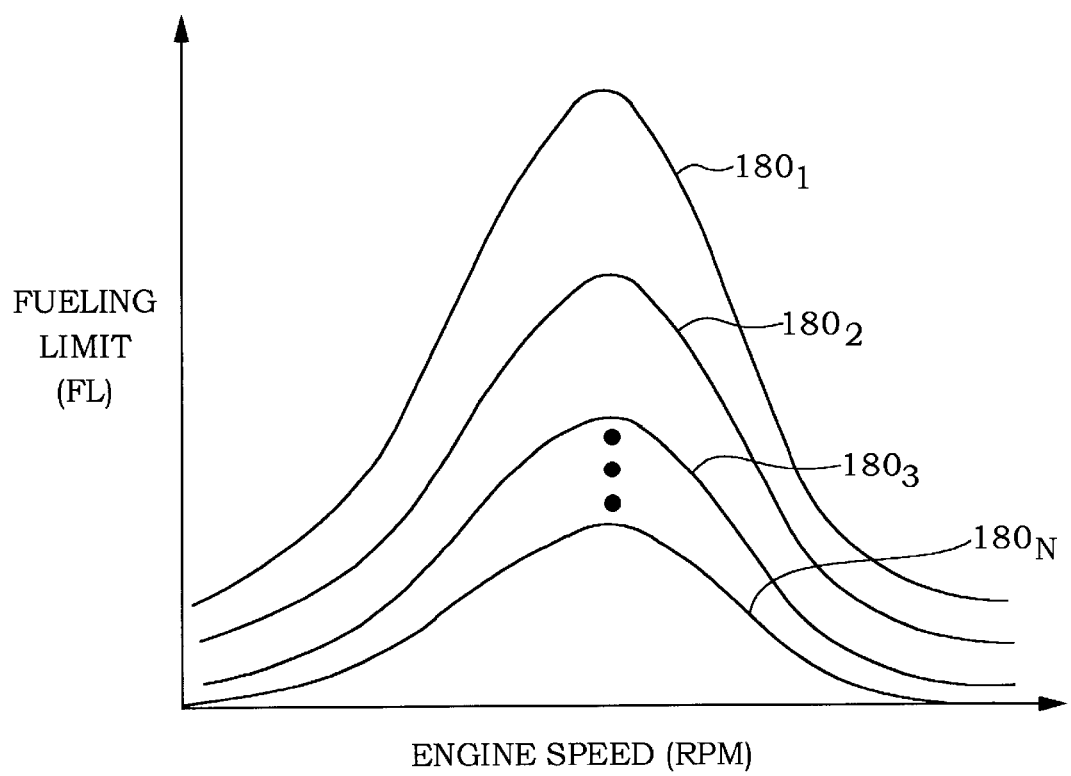
FIG. 6 is a plot of fueling limit vs. engine speed illustrating an alternate technique for executing the fueling limit determination step of FIG. 4.

Referring now to FIG. 6, an alternative embodiment of step 158 is illustrated as a plot of fueling limit values (FL) vs. engine speed values. In this embodiment, the fueling limit vs. engine speed plot may include any number, N, of constant-valued IMP curves $180_1$–$180_N$, wherein N may be any positive integer. Control computer 52 is operable, in this embodiment, to map current IMP and engine speed values to a corresponding fueling limit value FL. Alternatively, the IMP curves $180_1$–$180_N$ may be modified to include IMT information to thereby provide for more accurate operation.

Those skilled in the art will recognize that FIGS. 5 and 6 represent only two of many techniques for executing step 158 of algorithm 150, and that the primary importance of any such technique lies not in its specific process but instead in its ability to map IMP and engine speed values (and optionally IMT values) to an appropriate fueling limit value FL. In this regard, it is to be understood that the present invention contemplates other such techniques for executing step 158 including, but not limited to, one or more equations, graphical techniques, pattern recognition techniques and graphical techniques for relating IMP and ES values (and optionally IMT values) to FL values, and that any such techniques are intended to fall within the scope of the present invention.

Figure 3:
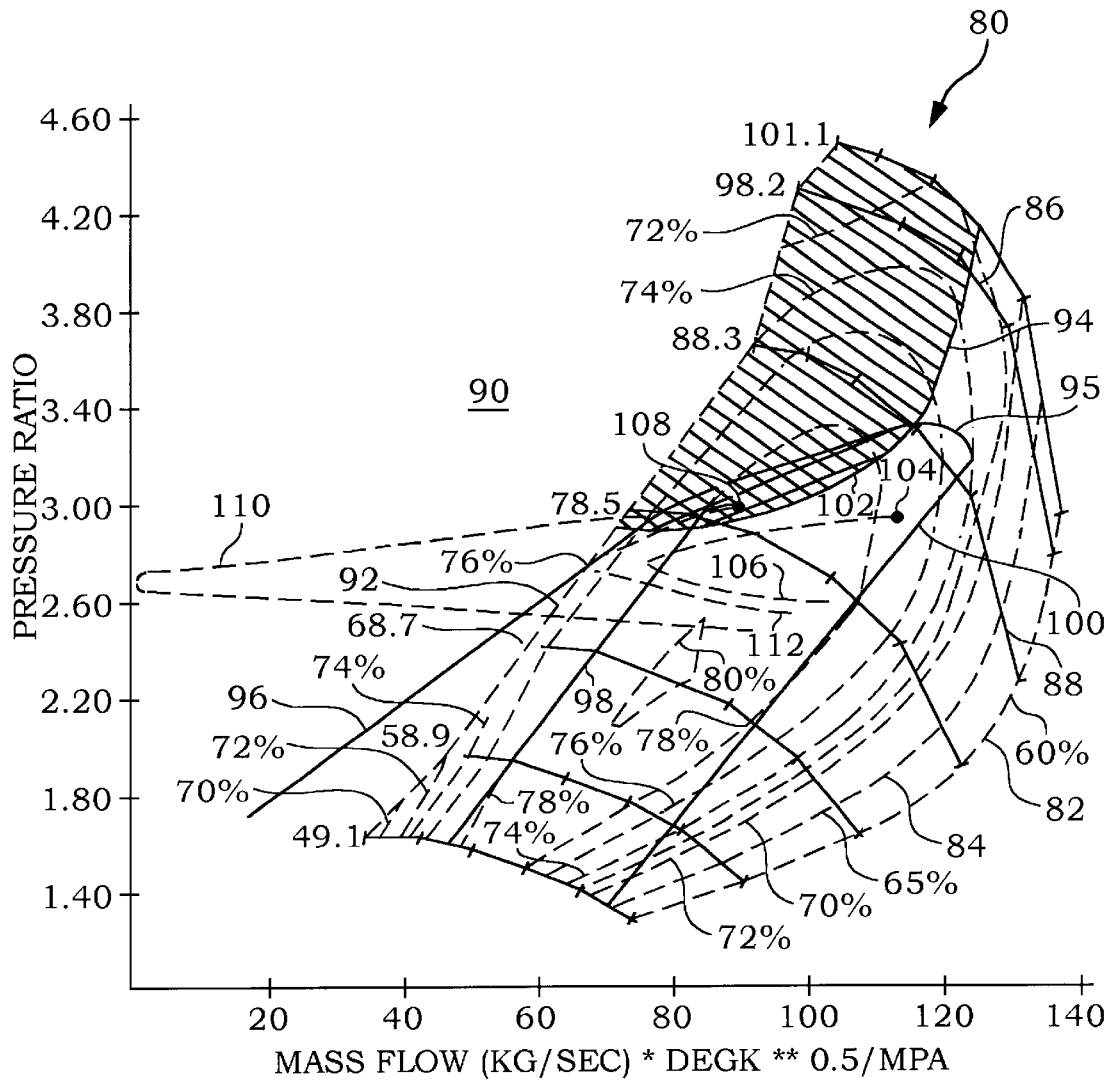
FIG. 3 is a plot of intake manifold pressure ratio vs. intake manifold mass air flow illustrating turbocharger transient compressor surge conditions relating thereto.

Referring again to FIG. 4, and regardless of the specific technique or process used to determine the fueling limit FL, the resulting FL value is preferably a minimum value of fueling that maintains engine operating conditions within map 80 of FIG. 3. In other words, when engine operating conditions are within the transient surge danger area 102, the fueling limit value FL produced by control computer 52 at step 158 is preferably higher than what the default fueling value minimum would normally be and is preferably of a value that maintains engine operating conditions within map 80 (as shown by example with dashed-line 112 in FIG. 3) to thereby avoid operation in the surge region 90. By imposing a higher minimum fueling limit under such conditions, engine operating conditions may therefore be controllably maintained within map 80 (e.g., along dashed line 112) to avoid turbocharger transient compressor surge.

From step 158, algorithm 150 advances to step 160 where control computer 52 compares the fueling limit FL determined at step 158 to the default fueling value; i.e., the current value of the fueling command produced by control computer 52 to normally control fuel system 60. If, at step 160, FL is less than or equal to the default fueling value, algorithm execution advances to step 162 where control computer 52 is operable to control fuel system 60 to fuel engine 54 based on default fueling command values. If, however, control computer 52 determines at step 160 that FL is greater than the default fueling value, algorithm execution advances to step 164 where control computer 52 is operable to establish FL as a minimum fueling limit and control fuel system 60 to fuel engine 54 with a minimum fueling value thereof limited to a value not less than FL. In this manner, turbocharger transient compressor surge is avoided. From either of steps 162 or 164, algorithm execution advances to step 166 where algorithm 150 is returned to its calling routine. Alternatively, step 166 may be omitted and steps 162 and 164 may return to step 152 for continuous execution of algorithm 150.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected.

What is claimed is:

1. A system for controlling transient compressor surge in a turbocharged internal combustion engine, comprising:
   a turbocharger including a turbocharger compressor fluidly coupled to a cylinder of an internal combustion engine via an intake manifold;
   means for determining an operating condition of said intake manifold and producing an intake manifold parameter signal corresponding thereto;
   a fuel system responsive to a fueling command to supply fuel to said engine; and
   a control circuit maintaining said fueling command above a minimum fueling limit based at least on said intake manifold parameter signal to avoid turbocharger transient compressor surge.

2. The system of claim 1 wherein said means for determining an operating condition of said intake manifold includes means for determining intake manifold air pressure and producing an intake manifold pressure signal corresponding thereto.

3. The system of claim 2 further including an engine speed sensor producing an engine speed signal corresponding to rotational speed of said engine;
   and wherein said control circuit is operable to determine said minimum fueling limit further based on said engine speed signal.

4. The system of claim 3 further including a memory having stored therein a functional representation relating values for said minimum fueling limit to said intake manifold pressure and said engine speed signals.

5. The system of claim 4 wherein said functional representation stored in said memory includes a table having a number of columns defining discrete values of one of said intake manifold pressure signal and said engine speed signal and a number of rows defining discrete values of the other of said intake manifold pressure signal and said engine speed signal, said table populated with values of said minimum fueling limit based on corresponding intake manifold pressure and engine speed values.

6. The system of claim 4 wherein said functional representation stored in said memory includes a number of intake manifold pressure curves plotted as functions of said engine speed signal and values of said minimum fueling limit, each of said number of intake manifold pressure curves corresponding to a different value of said intake manifold pressure signal.

7. The system of claim 2 wherein said means for determining an operating condition of said intake manifold further includes means for determining intake manifold air temperature and producing an intake manifold air temperature signal corresponding thereto.

8. The system of claim 7 further including an engine speed sensor producing an engine speed signal corresponding to rotational speed of said engine;

and wherein said control circuit is operable to determine said minimum fueling limit further based on said engine speed signal.

9. The system of claim 8 further including a memory having stored therein a functional representation relating values for said minimum fueling limit to said intake manifold pressure, intake manifold air temperature and engine speed signals.

10. The system of claim 9 wherein said functional representation stored in said memory includes a table having a number of columns defining discrete values of one of said engine speed signal and a combination of said intake manifold pressure and intake manifold air temperature signals, and a number of rows defining discrete values of the other of said combination of intake manifold pressure and intake manifold air temperature signals and said engine speed signal, said table populated with values of said minimum fueling limit based on corresponding engine speed values and combination intake manifold pressure and intake manifold air temperature values.

11. The system of claim 9 wherein said functional representation stored in said memory includes a number of combination intake manifold pressure and intake manifold air temperature curves plotted as functions of said engine speed signal and values of said minimum fueling limit, each of said number of combination intake manifold pressure and intake manifold air temperature curves corresponding to a different value of a combination of said intake manifold pressure and intake manifold air temperature signals.

12. The system of claim 1 wherein said means for determining an operating condition of said intake manifold and producing an intake manifold parameter signal corresponding thereto is disposed in fluid communication with said intake manifold.

13. A method of controlling transient compressor surge in a turbocharged internal combustion engine, comprising the steps of:

sensing at least one operating parameter of a turbocharged internal combustion engine;

determining a minimum fueling value as a function of said at least one operating parameter, said minimum fueling value corresponding to a minimum fueling condition above which turbocharger transient compressor surge is avoided; and fueling said engine with a lower fueling limit defined by said minimum fueling value.

14. The method of claim 13 wherein said fueling step further includes fueling said engine with a lower fueling limit defined by a greater of said minimum fueling value and a default fueling value.

15. The method of claim 13 wherein said at least one operating parameter includes at least one operating condition of an intake manifold disposed in fluid communication with a turbocharger compressor and a cylinder of said engine.

16. The method of claim 15 wherein said operating condition includes intake manifold air pressure.

17. The method of claim 16 wherein said at least one operating parameter further includes rotational speed of said engine.

18. The method of claim 16 wherein said operating condition includes intake manifold air temperature.

19. The method of claim 18 wherein said at least one operating parameter further includes rotational speed of said engine.

* * * * *